May 14, 1929.  B. T. MOTTINGER ET AL  1,712,800
METAL CUTTING TOOL
Original Filed Dec. 15, 1925   3 Sheets-Sheet 1
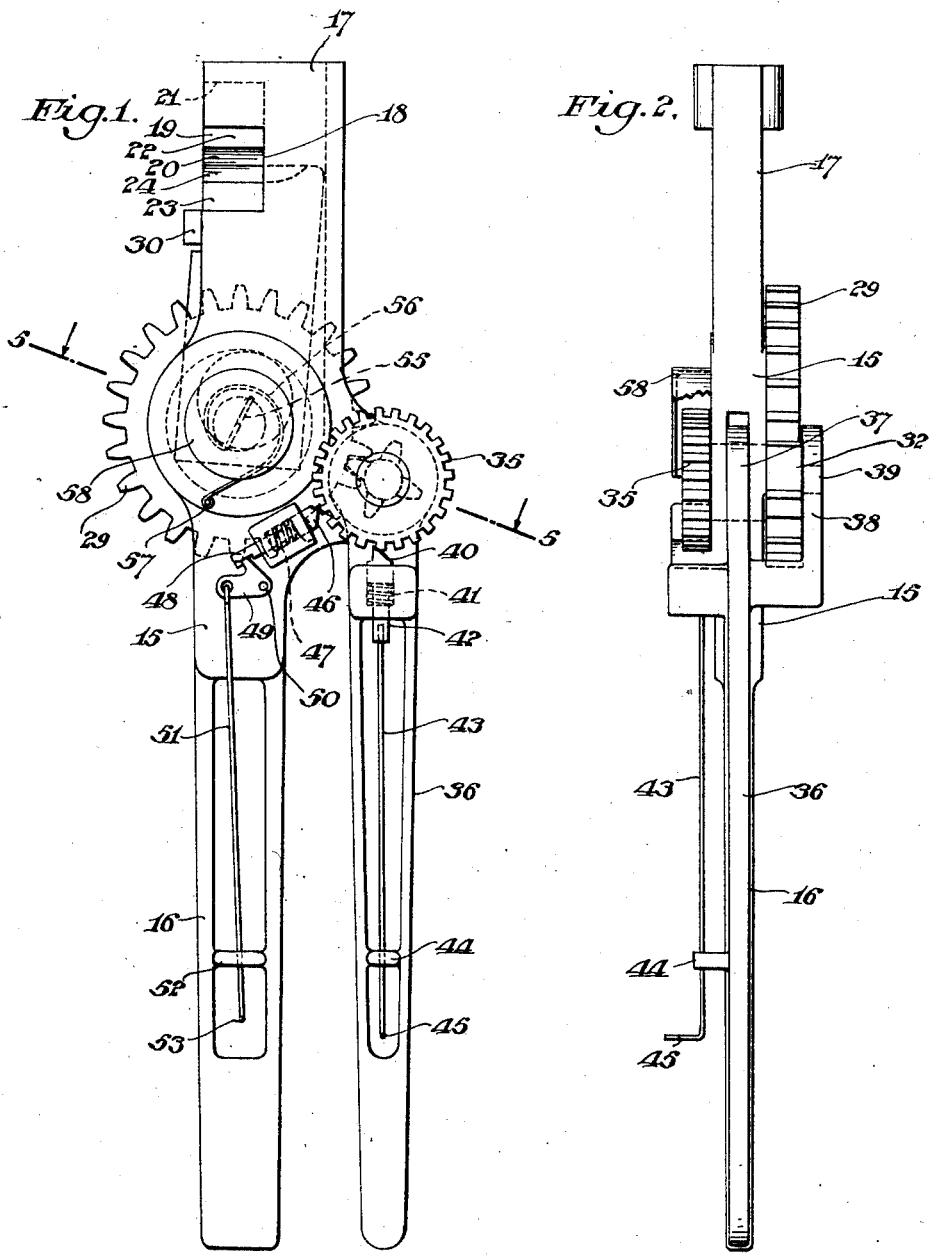
Inventors:
Byron T. Mottinger
and David W. McDowell,
By Jas. C. Wobusmith
Attorney.

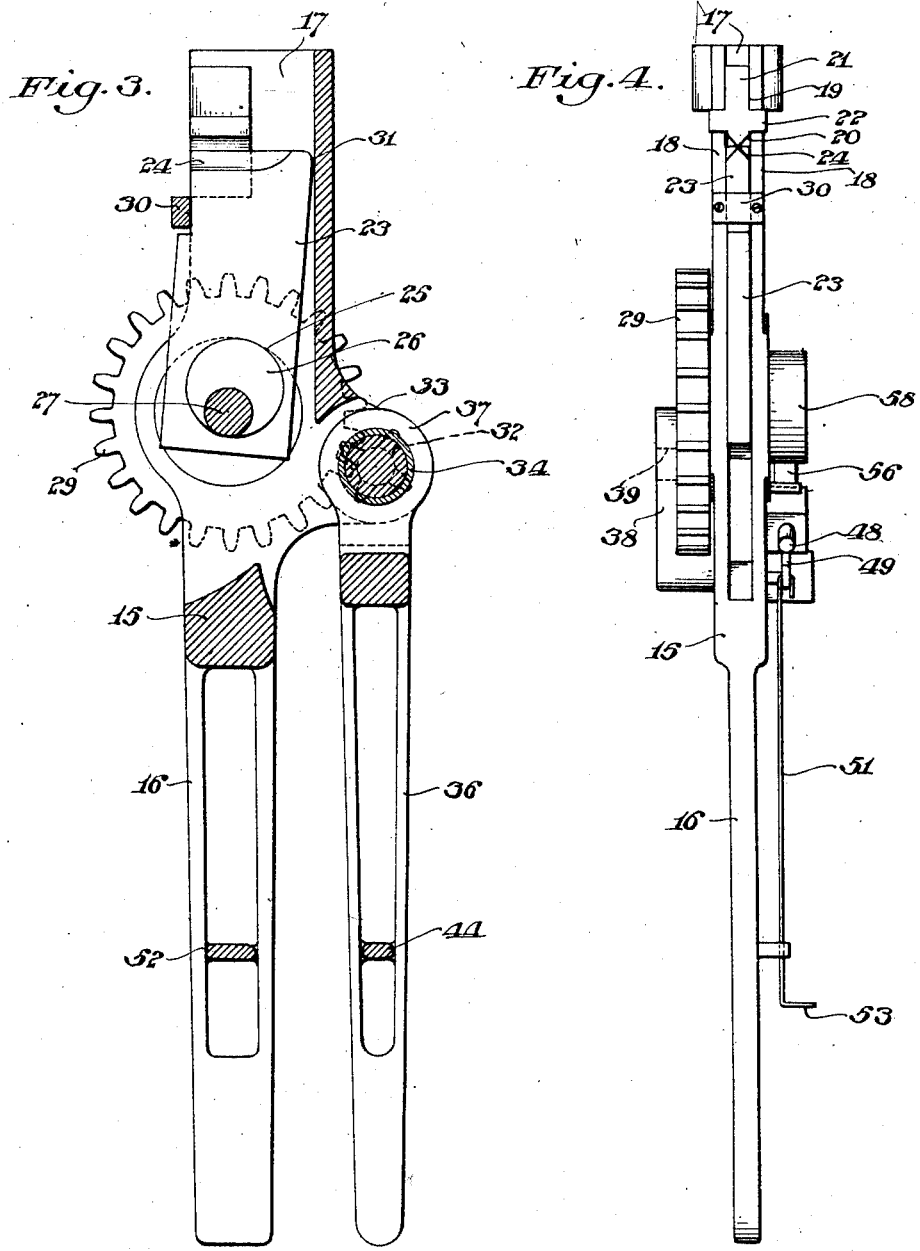

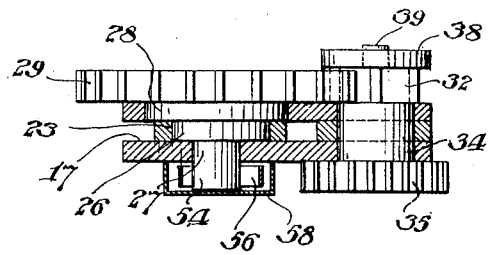
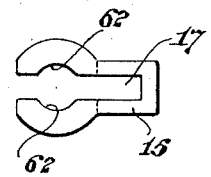
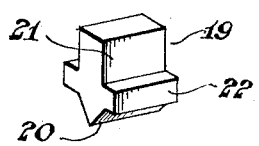
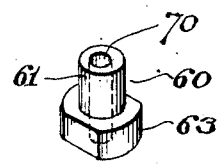
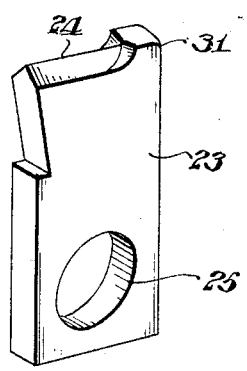
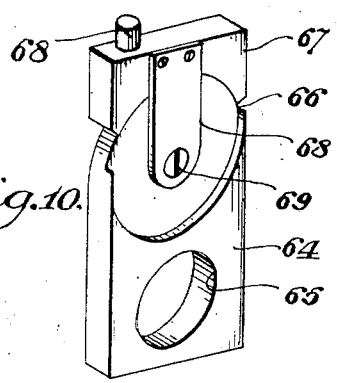

Patented May 14, 1929.

1,712,800

UNITED STATES PATENT OFFICE.

BYRON T. MOTTINGER AND DAVID W. McDOWELL, OF PHILADELPHIA, PENNSYLVANIA, ASSIGNORS, BY MESNE ASSIGNMENTS, TO H. K. PORTER, INC., OF EVERETT, MASSACHUSETTS, A CORPORATION OF MASSACHUSETTS.

METAL-CUTTING TOOL.

Application filed December 15, 1925, Serial No. 75,510. Renewed September 10, 1928.

Our invention relates to metal cutting tools, and it has particular relation to a tool for conveniently and expeditiously cutting metals, particularly hard materials such as round and flat bar steel.

The principal object of our invention is to provide a relatively simple, yet efficient metal cutting tool, which is so constructed and arranged as to make the same, by reason of the peculiar operation thereof, adaptable for cutting exceedingly hard materials with a minimum of effort on the part of the user, notwithstanding the extreme toughness of the material to be cut.

With the foregoing object in view, our invention contemplates the provision of a metal cutting tool in which the cutting members are not only brought together with considerable force, but in which one of the cutting members is so manipulated with respect to the other as the same is advanced that the cutting action will be greatly facilitated.

Our invention further contemplates the provision of a tool of the character aforesaid, in which the cutting members may be readily removed and punching devices substituted in lieu thereof, thus adding considerably to the usefulness of the tool.

Our invention still further contemplates, in a tool of the character aforesaid, certain improved details of construction and arrangement.

The nature and characteristic features of our invention will be more readily understood from the following description, taken in connection with the accompanying drawings forming part hereof, in which:

Figure 1 is a side elevation of a metal cutting tool embodying the main features of our present invention;

Fig. 2 is a rear elevation thereof;

Fig. 3 is a vertical section showing the internal construction and arrangement;

Fig. 4 is a front elevation of the tool;

Fig. 5 is a transverse section taken approximately on the line 5—5 of Fig. 1;

Fig. 6 is an elevation of one end of the main frame of the tool;

Fig. 7 is a perspective view of one of the cutting members detached;

Fig. 8 is a similar perspective view of the other cutting member which is adapted to coact therewith;

Fig. 9 is a perspective view of a die which is adapted to be substituted for one of the cutting members when the tool is to be used for punching; and Fig. 10 is a similar perspective view of the punch device which is adapted to coact with the die member of Fig. 9.

Referring to the drawings, in the particular embodiment of our invention therein shown, 15 is the main framework of the tool, having a handle portion 16 at one end, and having its other end channeled or slotted, as at 17, for a purpose which will hereinafter appear. Near the end of the slotted or channeled portion of the main framework is a cut-out portion 18, in one end of which is seated a stationary cutting member 19.

The stationary cutting member 19 is provided with a V-shaped cutting portion 20, a shank portion 21 which is adapted to be positioned in the slot or channel of the main framework, and a shoulder portion 22 which forms an abutment for the cutting member 19, to take the thrust when the force is applied in the operation of the tool.

The other cutting member 23 is slidably mounted in the slot or channel in the main framework. This cutting member 23 is provided with a V-shaped cutting portion 24 at its forward end, and near its inner end is provided with an aperture 25, which is engaged by an eccentric portion 26 of a rotatable member which is journaled in the main framework of the tool. The rotatable member is provided with two portions, 27 and 28, for journaling the same in the main frame, the portion 28 being of such relatively large diameter, and the portion 27 being of such relatively small diameter, as to permit the eccentric portion 26 to be readily inserted when the parts are being assembled. The rotatable member is also provided with a gear 29, preferably made integral therewith.

The forward end of the cutting member 23 is confined within the slot or channel by means of a bar 30 which is secured to the channeled portion of the framework on the open side thereof, and which extends across the slot or channel (see Figs. 3 and 4). It will also be noted that the inner forward corner 31 of the cutting member 23 bears against and is adapted to slide along the inner surface of the slot or channel in the forward end of the main framework of the tool.

The gear 29 of the rotatable member is engaged and adapted to be actuated by a pinion 32 which is journaled in extensions 33 of the main framework of the tool, and is preferably provided with a sleeve 34 to afford better bearing surfaces for the journaled portions. The pinion member 32 also carries a ratchet wheel 35 mounted on the end of the pinion member remote from the portion thereof which engages the gear 29.

A hand lever 36 is pivotally mounted in coaxial relationship with the pinion member. For the purpose of mounting the same, said lever is provided with a portion 37 which engages a portion of the sleeve 34 which is provided on the pinion member 32 for journaling the same, and said lever is also provided with an extension 38 which is journaled on a stud shaft 39 which is provided on the end of the pinion member 32, and which is preferably made integral therewith.

The hand lever 36 carries a pawl 40 which is adapted to engage the teeth of the ratchet wheel 35 which is secured to the pinion member 32. A spring 41 impels the pawl 40 forward to cause the same normally to engage the teeth of the ratchet. This arrangement is provided so that, as the hand lever 36 is oscillated about its axis, the pawl 40 will, during the movement of the hand lever 36 in one direction, slide over the teeth of the ratchet wheel, and during the movement of said lever in the other direction, said pawl will engage a tooth of the ratchet wheel, and the pinion member 32 will thereby be rotated.

The pawl 40 is provided with a rear extension 42 to which one end of a pull rod 43 is secured. The pull rod 43 is guided near its other end in a lug 44 extending from the side of the hand lever 36. The pull rod 43 is also provided with a bent out portion 45, whereby the operator may arbitrarily retract the pawl 40 from engagement with the ratchet 35.

The main framework of the tool also carries a pawl 46, which engages the teeth of the ratchet 35 and serves to prevent return movement of the pinion member during the cutting operation. The pawl member 46 is normally impelled forward by means of a spring 47. The pawl 46 is also provided with a rearward extension 48, which is engaged by one arm of a bell crank lever 49. The bell crank lever 49 is pivoted as at 50 to a portion of the main framework. The other arm of the bell crank lever 49 is engaged by one end of a pull rod 51 which extends along one side of the handle portion 16 of the main framework of the tool. The other end of the pull rod 51 is guided in a lug 52, and this end of the pull rod is also provided with an extension 53, whereby the same may be actuated by the operator to retract the pawl 46 from engagement with the ratchet 35, to release the same arbitrarily when the cutting operation has been completed, as will be hereinafter more fully set forth.

The journaled portion 27 of the rotatable member which carries the eccentric 26 is provided with an extending portion 54, which is provided with a transverse slot 55 in which one end of a coiled leaf spring 56 is mounted. The other end of the spring 56 engages a pin 57, which is mounted in the main framework of the tool. A cup shaped guard 58 encloses the main portion of the spring 56.

From the foregoing description, it will be apparent that an intermittent grip device will be provided for turning the cutter operating means during the cutting operation, and a quick return device will be provided to move said eccentrically operating device to starting position, but it is to be understood that the invention is not limited to the specific means shown for accomplishing these results.

The operation of the tool as above described will now be explained. The cutting member 23 being initially in its retracted position, the rod or bar to be cut is placed between the cutting portions of the members 23 and 19, and the handle portion 16 of the main frame is grasped by one hand of the operator. The operator then grasps the handle portion of the lever 36 with its other hand, and actuates said lever with a reciprocatory movement about its axis, whereupon the pawl 40 on the return movement of said lever will engage the teeth of the ratchet 35 and thus rotate the pinion 32.

The pinion 32, being in engagement with the gear 29, will cause the rotatable member which is mounted in the main framework of the tool to be rotated with a step by step motion. The eccentric 26, which is a part of the rotatable member, will thus cause the cutting member 23 to be pressed forward with considerable force, and thus bite its way through the bar or rod which is positioned between the cutting portions of the members 23 and 19.

As hereinbefore mentioned, the inner corner at the forward end of the member 23 slides along the inner surface of the slotted portion of the main framework, whereby a peculiar movement will be imparted to the cutting member 23 in that the relative angularity between the cutting edges of the two tool members will be slightly varied with each movement of the operating lever 36, so that the cutting edge of the member 29 will not only be pushed forward with considerable force as the same is advanced, but the angular relationship of said cutting edges will be slightly changed with each forward movement of the member 23, and in this manner the cutting action will be greatly facilitated.

It will be noted that the pawl 46, which is carried by the main frame of the tool, will serve to prevent the retraction of the cutting member 23 during the outward movement of the operating lever 36. It will also be noted that the cutting member 23, by reason of the employment of the eccentric for actuating the same, may be advanced only a distance sufficient to sever completely the rod or bar, and in this manner damage to the cutting portions of the tool will be prevented.

When the cutting operation is completed, the pawls 40 and 41, which engage the ratchet 35, may be arbitrarily retracted by the operator pulling upon the respective pull rods 43 and 51, whereupon the spring 56, which has one end connected to the rotatable member and the other end connected to the main frame, will cause the rotatable member to return and thereby retract the cutting member 23 within the slotted portion 14 of the main framework.

When it is desired to use the tool for a punching operation, the stationary cutting member 19 is removed from the end of the slotted portion of the framework, and the die 60 (shown in Fig. 9 of the drawings) is positioned in place thereof. The die 60 is provided with a shank portion 61, which is adapted to be positioned in a complemental recess 62 in the end portion of the framework (see Fig. 6). The die 60 is also provided with a shoulder 63 for taking the thrust during the punching operation.

The cutting member 23 is also removed, and the device shown in Fig. 10 is substituted in place thereof. This device comprises a main block 64 having an aperture 65 for engagement by the eccentric 26. The forward end of the block 64 is rounded, as at 66, and a member 67 is mounted on said rounded portion. The member 67 has a plate 68 secured thereto, which is pivotally connected by means of a screw 69 to the main block 64. In this manner, the member 67 is adapted to have a slightly pivotal motion with respect to the main block 64. The member 67 carries a punch 68, which is adapted to coact with a hole 70 in the die 60 to effect the punching operation.

The operation of the tool when the punch and die above described are employed, is substantially the same as hereinbefore described for the cutting operation, but it will, of course, be understood that the alinement of the punch 68 with the hole 70 in the die will be maintained by reason of the pivotal connection of the member 67 with the main block 64, notwithstanding the angularity of movement of the main block 64 while the same is being actuated by the eccentric 26.

It will be seen that by the foregoing arrangement there is provided a simple and efficient metal cutting tool, which is particularly adaptable for cutting extremely tough and hard materials, by reason not only of the great force exerted as the operating lever is actuated, but also by reason of the peculiar motion of one of the cutting tools with respect to the other, whereby the action is greatly facilitated.

It will also be seen that by the substitution of the punch and die devices for the cutting tools, there will be provided an exceedingly efficient and convenient punching device.

Having thus described the nature and characteristic features of our invention, what we claim as new and desire to secure by Letters Patent, is:

1. A metal cutting tool comprising a framework, a stationary cutting member mounted in said framework, a movable cutting member adapted to coact therewith, rotatable means engaging one portion of the movable cutting member and adapted to advance the same toward the stationary cutting member, another portion of the movable cutting member being guided in said framework whereby the angular relationship of the cutting members will be slightly varied with respect to each other as the movable cutting member is advanced, and means for actuating said rotatable means with a step by step motion.

2. A metal cutting tool comprising a framework, a stationary cutting member mounted in said framework, a movable cutting member adapted to coact therewith, a rotatable member mounted in the framework having an eccentric engaging one portion of the movable cutting member, another portion of the movable cutting member being guided in said framework whereby the angular relationship of the cutting members will be slightly varied with respect to each other as the movable cutting member is advanced, and hand operated means for actuating said rotatable member with a step by step motion.

3. A metal cutting tool comprising a framework, a stationary cutting member mounted in said framework, a movable cutting member adapted to coact therewith, a rotatable member mounted in the framework having an eccentric engaging one portion of the movable cutting member, another portion of the movable cutting member being guided in said framework whereby the angular relationship of the cutting members will be slightly varied with respect to each other as the movable cutting member is advanced, hand operated means for actuating said rotatable member with a step by step motion, and gearing interposed between said rotatable members and the means for actuating the same.

4. A metal cutting tool comprising a framework, a stationary cutting member mounted in said framework, and a movable cutting member adapted to coact therewith, a rotatable member mounted in the framework having an eccentric adapted to actuate said movable cutting member, and hand operated means for actuating said rotatable member with a step by step motion.

5. A metal cutting tool comprising a framework, a stationary cutting member mounted in said framework, and a movable cutting member adapted to coact therewith, a rotatable member mounted in the framework having an eccentric adapted to actuate said movable cutting member, a gear carried by said rotatable member, a pinion meshing with and adapted to actuate said gear, and hand operated means for actuating said pinion.

6. A metal cutting tool comprising a framework, a stationary cutting member mounted in said framework, and a movable cutting member adapted to coact therewith, a rotatable member mounted in the framework having an eccentric adapted to actuate said movable cutting member, a gear carried by said rotatable member, a pinion meshing with and adapted to actuate said gear, and a pivotally mounted operating lever for actuating said pinion.

7. A metal cutting tool comprising a framework, a stationary cutting member mounted in said framework, and a movable cutting member adapted to coact therewith, a rotatable member mounted in the framework having an eccentric adapted to actuate said movable cutting member, a gear carried by said rotatable member, a pinion meshing with and adapted to actuate said gear, a pivotally mounted operating lever, and means for actuating said pinion with a step by step motion as said lever is operated.

8. A metal cutting tool comprising a framework, a stationary cutting member mounted in said framework, and a movable cutting member adapted to coact therewith, a rotatable member mounted in the framework having an eccentric adapted to actuate said movable cutting member, a gear carried by said rotatable member, a pinion meshing with and adapted to actuate said gear, a pivotally mounted operating lever, and ratchet mechanism for actuating said pinion when said lever is operated.

9. A metal cutting tool comprising a framework, a stationary cutting member mounted in said framework, and a movable cutting member adapted to coact therewith, a rotatable member mounted in the framework having an eccentric adapted to actuate said movable cutting member, releasable means adapted to return the eccentric to its initial position automatically when the cutting operation is completed, and hand operated means for actuating said rotatable member.

10. A metal cutting tool comprising a framework, a stationary cutting member mounted in said framework, and a movable cutting member adapted to coact therewith, a rotatable member mounted in the framework having an eccentric adapted to actuate said movable cutting member, a spring coiled around a portion of said rotatable member having one end secured thereto and the other end secured to the framework and adapted to return the eccentric to its initial position when the cutting operation is completed, and hand operated means for actuating said rotatable member.

11. A metal cutting tool comprising a framework, a stationary cutting member mounted in said framework, and a movable cutting member adapted to coact therewith, a rotatable member mounted in the framework having an eccentric adapted to actuate said movable cutting member, means adapted to return the eccentric to its initial position when the cutting operation is completed, a gear carried by said rotatable member, a pinion meshing with and adapted to actuate said gear, a pivotally mounted operating lever, and ratchet mechanism carried by said operating lever for actuating said pinion when said lever is operated.

12. A metal cutting tool comprising a framework, a stationary cutting member mounted in said framework, and a movable cutting member adapted to coact therewith, a rotatable member mounted in the framework having an eccentric adapted to actuate said movable cutting member, a spring adapted to return the eccentric to its initial position when the cutting operation is completed, a gear carried by said rotatable member, a pinion meshing with and adapted to actuate said gear, a pivotally mounted operating lever, and ratchet mechanism for actuating said pinion when said lever is operated.

13. A metal cutting tool comprising a framework, a stationary cutting member mounted in said framework, and a movable cutting member adapted to coact therewith, a rotatable member mounted in the framework having an eccentric adapted to actuate said movable cutting member, a spring coiled around a portion of said rotatable member having one end secured thereto and the other end secured to the framework and adapted to return the eccentric to its initial position when the cutting operation is completed, a gear carried by said rotatable member, a pinion meshing with and adapted to actuate said gear, a pivotally mounted operating lever, and ratchet mechanism for actuating said pinion when said lever is operated.

14. A metal cutting tool comprising a framework, a stationary cutting member mounted in said framework, and a movable cutting member adapted to coact therewith, a rotatable member mounted in the framework having an eccentric adapted to actuate said movable cutting member, a spring coiled around a portion of said rotatable member having one end secured thereto and the other end secured to the framework and adapted to return the eccentric to its initial position when the cutting operation is completed, a gear carried by said rotatable member, a pinion meshing with and adapted to actuate said gear, a pivotally mounted operating lever, ratchet mechanism for actuating said pinion when said lever is operated, and means for arbitrarily disengaging said ratchet mechanism.

15. A metal cutting tool comprising a framework, a stationary cutting member mounted in said framework, and a movable cutting member adapted to coact therewith, a rotatable member mounted in the framework having an eccentric adapted to actuate said movable cutting member, a gear carried by said rotatable member, a pinion meshing with and adapted to actuate said gear, a ratchet wheel secured to said pinion, a pivotally mounted operating lever, a pawl carried by said operating lever normally engaging said ratchet wheel to actuate the same, and means for arbitrarily retracting said pawl from said ratchet wheel, a pawl carried by the framework normally engaging said ratchet wheel to prevent reverse movement thereof during the cutting operation of the tool, and means for arbitrarily retracting said last mentioned pawl.

16. A metal cutting tool comprising a framework, a stationary cutting member mounted in said framework, and a movable cutting member adapted to coact therewith, a rotatable member mounted in the framework having an eccentric adapted to actuate said movable cutting member, means adapted to return the eccentric to its initial position when the cutting operation is completed, a gear carried by said rotatable member, a pinion meshing with and adapted to actuate said gear, a ratchet wheel secured to said pinion, a pivotally mounted operating lever, a pawl carried by said operating lever normally engaging said ratchet wheel to actuate the same, and means for arbitrarily retracting said pawl from said ratchet wheel, a pawl carried by the framework normally engaging said ratchet wheel to prevent reverse movement thereof during the cutting operation of the tool, and means for arbitrarily retracting said last mentioned pawl.

17. A metal cutting tool comprising a framework, a stationary cutting member mounted in said framework, and a movable cutting member adapted to coact therewith, a rotatable member mounted in the framework having an eccentric adapted to actuate said movable cutting member, a spring adapted to return the eccentric to its initial position when the cutting operation is completed, a gear carried by said rotatable member, a pinion meshing with and adapted to actuate said gear, a ratchet wheel secured to said pinion, a pivotally mounted operating lever, a pawl carried by said operating lever normally engaging said ratchet wheel to actuate the same, and means for arbitrarily retracting said pawl from said ratchet wheel, a pawl carried by the framework normally engaging said ratchet wheel to prevent reverse movement thereof during the cutting operation of the tool, and means for arbitrarily retracting said last mentioned pawl.

18. A metal cutting tool comprising a framework, a stationary cutting member mounted in said framework, and a movable cutting member adapted to coact therewith, a rotatable member mounted in the framework having an eccentric adapted to actuate said movable cutting member, a spring coiled around a portion of said rotatable member having one end secured thereto and the other end secured to the framework and adapted to return the eccentric to its initial position when the cutting operation is completed, a gear carried by said rotatable member, a pinion meshing with and adapted to actuate said gear, a ratchet wheel secured to said pinion, a pivotally mounted operating lever, a pawl carried by said operating lever normally engaging said ratchet wheel to actuate the same, and means for arbitrarily retracting said pawl from said ratchet wheel, a pawl carried by the framework normally engaging said ratchet wheel to prevent reverse movement thereof during the cutting operation of the tool, and means for arbitrarily retracting said last mentioned pawl.

19. A metal cutting tool comprising a framework, a stationary cutting member mounted in said framework, a movable cutting member adapted to coact therewith, a rotatable member mounted in the framework having an eccentric engaging one portion of the movable cutting member and adapted to advance the same toward the stationary cutting member, punch and die devices adapted to be substituted for said cutting members, one of said punch and die devices comprising a main block engaged by the eccentric, and a member pivotally connected therewith carrying the punching element.

20. A portable metal cutting tool comprising, in combination, an arm carrying a cutting blade, a relatively movable cutting blade carried thereby and having a recess, an eccentrically operating device mounted on said arm, and engaging the recess, an intermittent grip device for turning said device including a lever handle, said arm and handle operating in the manner of pincers.

21. A portable metal cutting tool comprising, in combination, an arm carrying a cutting blade, a relatively movable cutting blade carried thereby and having a recess, an eccentrically operating device mounted on said arm, and engaging the recess, an intermittent grip device for turning said device including a lever handle, said arm and handle operating in the manner of pincers, and separate quick return means to move said eccentrically operating device to starting position.

In testimony whereof, we have hereunto signed our names.

BYRON T. MOTTINGER.
DAVID W. McDOWELL.